(12) United States Patent
Jiang

(10) Patent No.: US 11,325,212 B2
(45) Date of Patent: May 10, 2022

(54) PREPARATION PROCESS OF NOVEL DRILL SHANK FOR IMPACT GUN DRILL

(71) Applicant: JALOR INDUSTRY CO., LIMITED, Danyang (CN)

(72) Inventor: Ning Jiang, Danyang (CN)

(73) Assignee: JALOR INDUSTRY CO., LIMITED, Danyang (CN)

( * ) Notice: Subject to any disclaimer, the term of this patent is extended or adjusted under 35 U.S.C. 154(b) by 0 days.

(21) Appl. No.: 17/156,664

(22) Filed: Jan. 25, 2021

(65) Prior Publication Data

US 2021/0402530 A1 Dec. 30, 2021

(30) Foreign Application Priority Data

Jun. 29, 2020 (CN) .......................... 202010603266.0

(51) Int. Cl.
*B23P 15/28* (2006.01)

(52) U.S. Cl.
CPC .................................. *B23P 15/28* (2013.01)

(58) Field of Classification Search
CPC .............................. B23P 15/28; B23P 15/32
USPC ....................................................... 76/108.1
See application file for complete search history.

(56) References Cited

U.S. PATENT DOCUMENTS

| 6,132,148 | A | * | 10/2000 | Thompson | ............... | B23B 51/02 |
| | | | | | | 408/144 |
| 8,834,077 | B2 | * | 9/2014 | Yoon | ....................... | C22C 38/08 |
| | | | | | | 408/1 R |
| 2011/0182684 | A1 | * | 7/2011 | Yoon | ....................... | B22F 7/062 |
| | | | | | | 408/226 |

FOREIGN PATENT DOCUMENTS

DE 112019004149 T5 * 8/2021 ................ B22F 5/00

* cited by examiner

*Primary Examiner* — Omar Flores Sanchez
(74) *Attorney, Agent, or Firm* — Bayramoglu Law Offices LLC

(57) ABSTRACT

A preparation process of a novel drill shank for an IMPACT gun drill, including: manufacturing a mold and a forming block, wherein a forming blind hole is formed in a middle of the mold, the forming block is inserted into the forming blind hole, a wire pipe is disposed in the mold, a feed port is formed in the forming block, a heating cavity is formed in a forming block lateral face and a forming post; manufacturing the forming block with a 2Cr25Ni20 material; injecting tin bronze powder and iron powder into the forming blind hole, starting vibration pressing by the forming block; inputting direct and pulse current to communicate with the metal powder and heat the metal powder at a same time; forming a drill shank blank after 2-3 min, taking out the drill shank blank; removing an adsorbing agent from the drill shank blank by an extraction method.

9 Claims, 3 Drawing Sheets

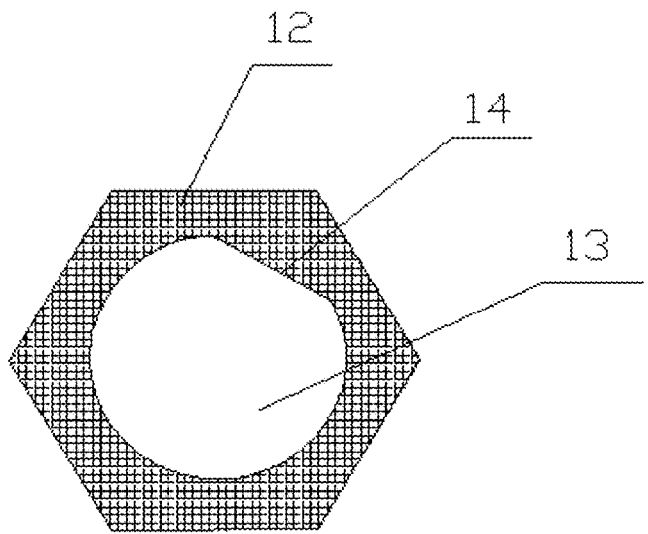
FIG. 3
FIG. 4
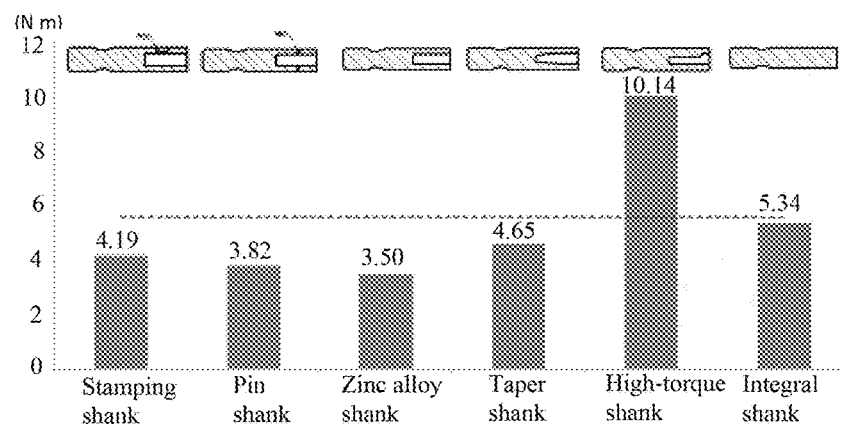
FIG. 5

Radial runout test comparison

PREPARATION PROCESS OF NOVEL DRILL SHANK FOR IMPACT GUN DRILL

CROSS-REFERENCE TO RELATED APPLICATION

This application claims priority to and the benefit of Chinese Patent Application No. 202010603266.0, filed on Jun. 29, 2020, the disclosure of which is incorporated herein by reference in its entirety.

TECHNICAL FIELD

The present invention belongs to the technical field of an electric power tool accessory, and particularly relates to a preparation process of a novel drill shank for an IMPACT gun drill.

BACKGROUND

IMPACT gun drills are widely used to drill holes in objects or pierce objects in the industries of building construction, decoration, furniture and the like, provide a torque being three times that of a conventional gun drill, and are also known as percussive gun drills in some industries. The IMPACT gun drill is a screw tightening and hole drilling tool powered by an AC power supply or a DC battery, and is a kind of hand-held electric power tool. When the IMPACT gun drill is used to drill a hole, a diameter of the drilled hole is usually not too large (≤6 mm), but when a drill bit is put into a drill shank, large torque and small runout are required. Even if a micro drill bit is used to drill the hole, fast penetration is required, which put forwards a high requirement on an internal structure of the drill shank.

At present, there are 6 kinds of drill shanks, including a stamping shank, a pin shank, a zinc alloy shank, a taper shank, a high-torque shank and an integral shank, as shown in FIG. 4. The torque, the IMPACT strength and the radial runout of a drill bit of 3 mm below of the stamping shank do not meet the standard. The torque and the IMPACT strength of a drill bit of the pin shank do not meet the standard. The zinc alloy shank generates deformation, and the IMPACT strength does not meet the standard. The torque and the IMPACT strength of a drill bit of the taper shank do not meet the standard. Only the performance of the high-torque shank and the performance of the integral shank meet the standard, but the integral shank is not considered by a manufacturer due to more manufacturing work procedures (13-14 work procedures), high cost, coaxiality difficulty and the like. Therefore, the high-torque shank becomes a hotspot in the market. For the high-torque shank, a non-cylinder cavity is formed inside the drill shank, a plane is formed at one side of a hole, and a plane is also formed at a lateral face of a matched drill bit shank. The drill bit shank extends into the drill shank, and is slowly rotated. When the two planes are fit, this represents that the installation is successful (there is glue between the two planes for adhesion). Since the two planes are in tight fit, when an electric hand drill rotates, the torque of the drill bit is large, and the hole drilling precision is high.

To achieve this, high requirements are made on the drill shank, that is, the strength, the toughness and the coaxiality are required, and low manufacturing cost and processing convenience are also required. Therefore, there is a need for studying this by research personnel.

SUMMARY

In order to solve the above problems, the present invention discloses a preparation process of a novel drill shank for an IMPACT gun drill, having the advantages of simple process steps, low energy consumption, high forming quality of the drill shank, stable performance, good efficiency and high practicability.

In order to achieve the above objectives, the present invention adopts the following technical solution:

The preparation process of the novel drill shank for the IMPACT gun drill includes the following steps:

(1) manufacturing a mold and a forming block, wherein a forming blind hole is formed in the middle of the mold, an arc-shaped groove is formed at a bottom of the forming blind hole, a square groove is formed at an outer side of a top of the arc-shaped groove, the forming block is of a cylinder structure with a downward opening, a vertical forming post is disposed in the forming block at the middle position, a top of the forming post is connected with a back face of the forming block, a lower end of a forming block lateral face is inserted into the square groove, a length of the forming post is smaller than a length of the forming block, a wire pipe is disposed in the mold, a pull ring is disposed on the forming block, a feed port is formed at one side of the pull ring, and a heating cavity is formed in the forming block lateral face and the forming post;

(2) manufacturing the forming block with a 2Cr25Ni20 material;

(3) preparing metal powder, wherein for a material of the metal powder, 40% of iron powder and 0.5-0.6% of an adsorbing agent are added into tin bronze powder according to a weight ratio, and are uniformly stirred;

(4) injecting the metal powder into the forming blind hole from the feed port, and sealing the feed port;

(5) connecting the forming block to a vibration machine through the pull ring to start vibration pressing, inputting direct current and pulse current to communicate with the metal powder, enabling a heating temperature in the heating cavity to be 860-870° C., forming a drill shank blank after 2-3 min, and taking out the drill shank blank;

(6) removing the adsorbing agent from the drill shank blank by an extraction method;

(7) performing surface processing and deburring; and (8) finally performing sintering densification to obtain a finished product.

As an improvement of the present invention, in step (1), a cross section of the forming blind hole is in a triangular, square, pentagonal or hexagonal shape.

As an improvement of the present invention, in step (1), the forming post is of a non-cylinder structure with a plane, but is substantially still a cylinder provided with one or a plurality of planes at a lateral face of the cylinder.

As an improvement of the present invention, in step (1), the lower end of the forming block lateral face is in wedge fit with a lateral face of the square groove, and an inner side diameter of the forming block is the same as an inner side diameter of the square groove.

As an improvement of the present invention, in step (1), the feed port is a conical hole with a large upper part and a small lower part.

As an improvement of the present invention, in step (3), a particle size of the metal powder is 5-15 μm.

As an improvement of the present invention, in step (3), the adsorbing agent is graphene.

As an improvement of the present invention, in step (5), a depth of the square groove is greater than a vibration amplitude.

As an improvement of the present invention, in step (8), a sintering temperature is 1550° C.

Beneficial effects of the present invention are as follows:

(1) The present invention uses a powder pressing+electric spark forming+sintering method, the process is novel, the manufacturing is convenient, and the processing cost is low.

(2) For the metal powder, 40% of iron powder is added into tin bronze powder. According to an iron-copper alloy sintering principle and state diagram, an optimum heating temperature is 820-850° C., and the obtained blank has high strength, also has good toughness, impact resistance, and mechanical performance at the same time and has no deformation.

(3) The forming block is manufactured with a 2Cr25Ni20 material, which is oxidation resistant steel capable of being heated repeatedly, has no easy-to-peel scales at a temperature of 1000° C. or below, and can be easily separated from the blank.

(4) The inside of the finally obtained finished product of the drill shank is of a non-cylinder cavity structure with a plane, the finished product of the drill shank is matched with a chuck of an existing IMPACT electric hand drill, and 1-4 planes are formed at the lateral face of the non-cylinder cavity, so that the assembly and the torque transmission are convenient, and the torque is improved by 1-2 times compared with that of an ordinary drill shank.

BRIEF DESCRIPTION OF THE DRAWINGS

FIG. 3 is a top view of a drill shank of the present invention;

FIG. 4 is a schematic diagram of advantages and disadvantages of 6 kinds of drill shanks in the related art of the present invention;

FIG. 5 is a torque test comparison diagram of 6 kinds of drill shanks;

Figure 1:
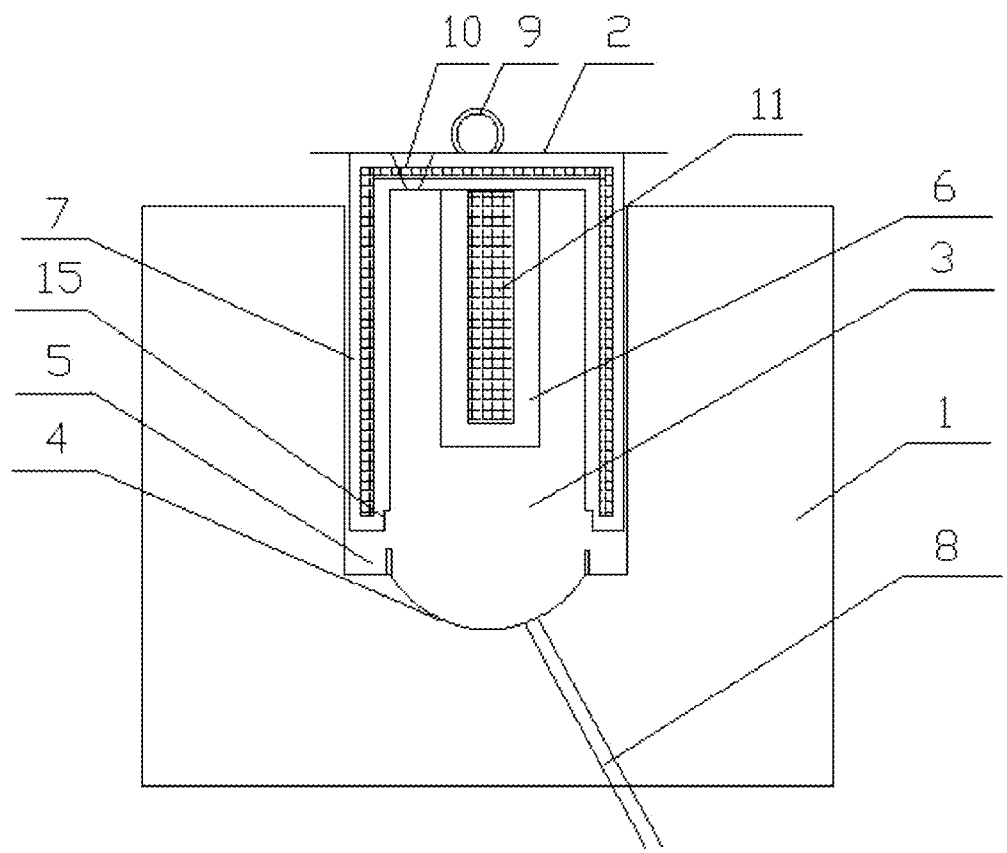
FIG. 1 is a schematic structure diagram of a mold and a forming block of the present invention.
Figure 2:
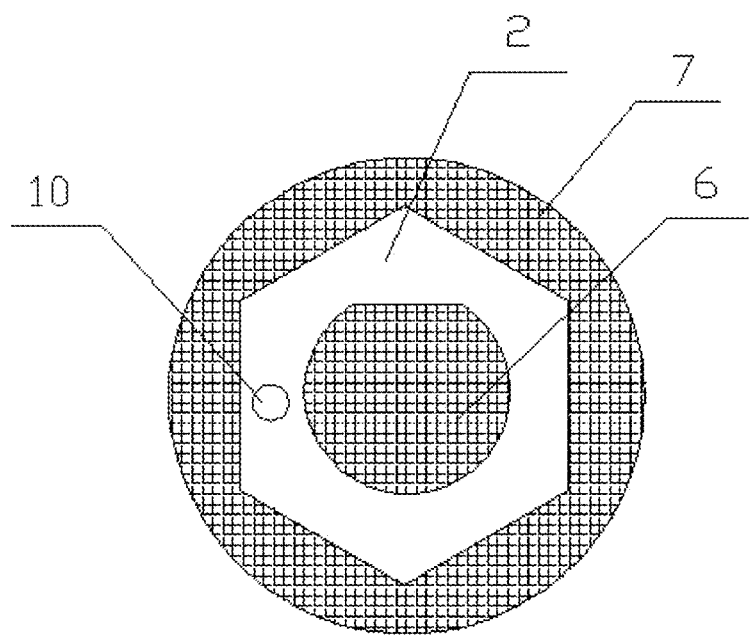
FIG. 2 is a bottom view of the forming block of the present invention.
Figure 6:
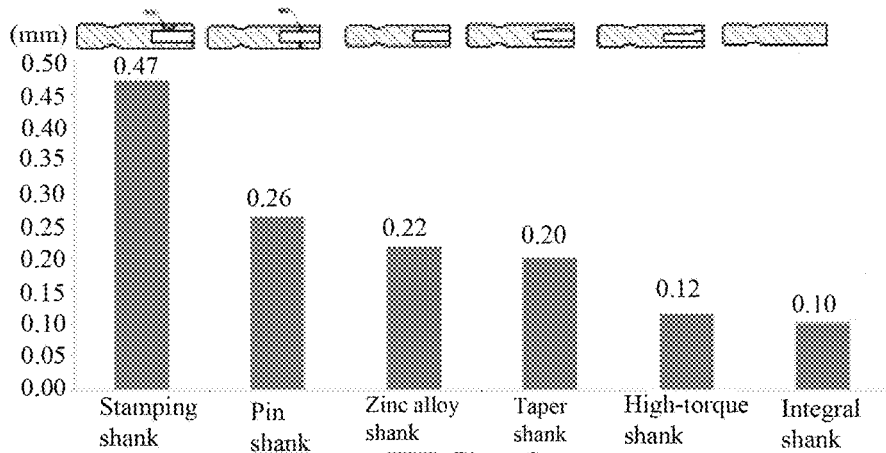
FIG. 6 is a radial runout test comparison diagram of 6 kinds of drill shanks.

LIST OF REFERENCE NUMERALS 1 mold; 2 forming block; 3 forming blind hole; 4n arc-shaped groove; 5 square groove; 6 forming post; 7 forming block lateral face; 8 wire pipe; 9 pull ring; 10 feed port; 11 heating cavity; 12 drill shank; 13 non-cylinder cavity; 14 plane; and 15 wedge.

DETAILED DESCRIPTION OF THE EMBODIMENTS

The present invention is described further below with reference to drawings and specific implementations. It should be understood that these specific implementations are merely intended to illustrate the present invention and are not intended to limit the scope of the present invention.

As shown in the figures, according to a preparation process of a novel drill shank for an IMPACT gun drill of the present invention, a mold 1 and a forming block 2 are firstly manufactured. A forming blind hole 3 (triangular, square, pentagonal or hexagonal) is formed in the middle of the mold 1. An arc-shaped groove 4 is formed at a bottom of the forming blind hole 3. A square groove 5 is formed at an outer side of a top of the arc-shaped groove 4. The forming block 2 is of a cylinder structure with a downward opening. A vertical forming post 6 is disposed in the forming block 2 at the middle position. A top of the forming post 6 is connected with a back face of the forming block 2. A lower end of a forming block lateral face 7 is inserted into the square groove. A length of the forming post 6 is smaller than a length of the forming block 2. A wire pipe 8 is disposed in the mold 1. A pull ring 9 is disposed on the forming block 2. A feed port 10 is formed at one side of the pull ring 9. A heating cavity 11 is formed in the forming block lateral face 7 and the forming post 6.

Figure 7:
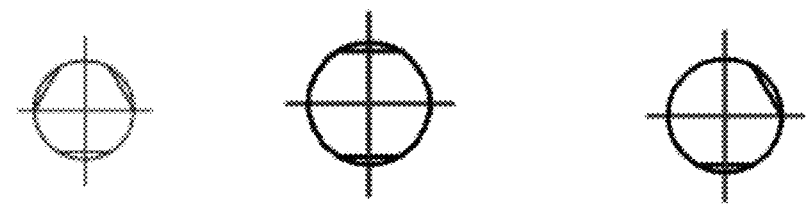
FIG. 7 is a cross-sectional diagram of a plurality of kinds of structures of forming posts.
Figure 7:
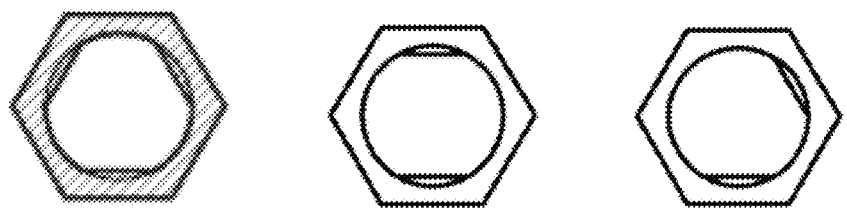
Figure 8:
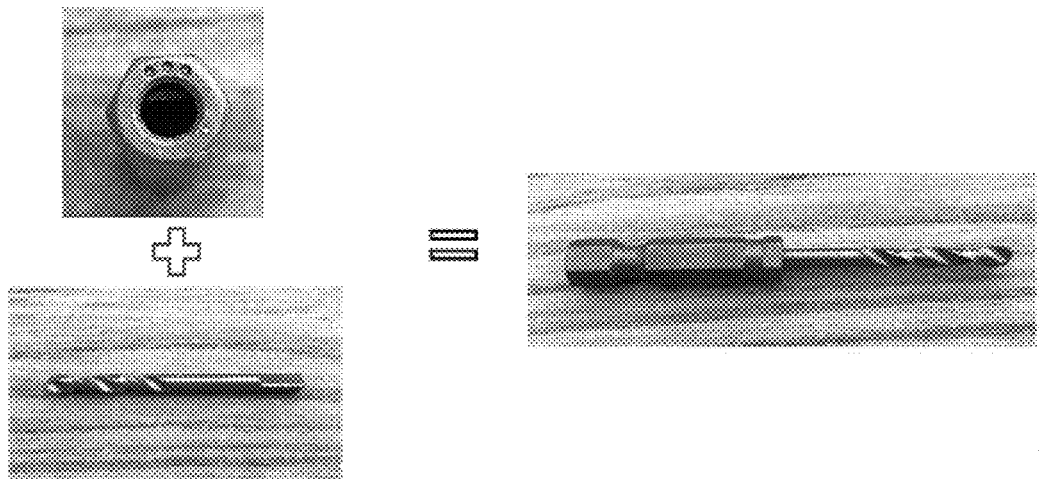
FIG. 8 is an assembly diagram of a drill shank and a drill bit.

In use, the forming block 2 is inserted into the forming blind hole 3, and the lower end of the forming block lateral face 7 is inserted into the square groove 5, as shown in FIG. 1. A space between a lower part of the forming block 2 and the forming blind hole 3 is a drill shank processing space. Firstly, metal powder is injected into the forming blind hole 3 from the feed port 10. After full injection, the feed port 10 is plugged and sealed. Then, a vibration machine drives the pull ring 9 to start vibration and to downwards press metal powder mixture inside until an upper plane of the forming block 2 is highly jacked to be a little higher than an upper plane of the mold 1 (a volume of the injected metal powder mixture is 5-8% greater than a volume of a finished product). At the same time, direct current and pulse current are input through electric sparks at the bottom, so as to communicate with the metal powder mixture. At the same time, an electric heating wire inside the heating cavity starts, and the metal powder mixture is heated at a heating temperature of 860-870° C. During pressing, electric spark forming is performed. Formation can be completed just by 2-3 min. The upper plane of the forming block 2 is flushed with the upper plane of the mold 1. A drill shank blank is taken out. At the moment, the blank has been formed, and cannot deform. The blank is in a hexagonal shape (may also be in a triangular shape, a quadrangular shape or a quinquangular shape). A non-cylinder cavity 13 is formed inside the blank. A hole diameter of the inside cavity generally does not exceed 6 mm. 1-4 planes 14 are formed at a lateral face of the non-cylinder cavity 13, as shown in FIG. 7. Then, deburring and surface processing are performed. Finally, a finished product is obtained through sintering densification. The present invention uses a powder pressing+electric spark forming+sintering method, after the electric spark forming, its structural shape cannot change, the dimension precision is high, and the dimension will not be influenced by the subsequent sintering, so that the matching precision of the finished product of the drill shank and the drill bit is high.

The inside non-cylinder cavity of the manufactured finished product of the drill shank can be used to clamp an arch-shaped surface drill shank (one plane), or a two-side-milled or three-side-milled drill shank. The planes of the two-side-milled drill shank may be symmetrical or nonsymmetrical, as shown in FIG. 7.

The forming block 2 of the present invention is manufactured with a 2Cr25Ni20 material, and can be taken up by gasping the pull ring 9. An inside surface of the forming block is not adhered to a surface of the drill shank, so that the demolding is convenient. The material oxidation resistant steel 2Cr25Ni20 is used, and can be easily separated from the blank. Additionally, the forming block can be repeatedly heated, has no scales even at 1000° C., and is suitable for scaled production.

For a material of the metal powder of the invention, 40% of iron powder and 0.5-0.6% of an adsorbing agent are added into tin bronze powder according to a weight ratio, and are uniformly stirred. Then, pressing+electric spark forming is performed. The adsorbing agent (graphene) in the blank is removed. The drill shank obtained after sintering has high strength, and also has toughness, impact resistance, high torque and small radial runout at the same time. The service life is 1 to 2 times longer than that of a zinc alloy shank The graphene of the present invention has a greater specific surface area, is not polluted by metal ions, and is thus used as the adsorbing agent for the metal powder. After the drill shank is formed, the adsorbing agent in the drill shank blank is removed by an extraction method. The recovery rate is high. The preparation cost is reduced.

The forming post 6 of the present invention is a non-cylinder structure with a plane, but is substantially still a cylinder provided with one or a plurality of planes at a lateral face of the cylinder, as shown in FIG. 3 and FIG. 7, to ensure high torque of the drill bit.

In step (1) of the present invention, the lower end of the forming block lateral face 7 is in wedge 15 fit with the lateral face of the square groove 5, as shown in FIG. 1. An inner side diameter of the forming block is the same as an inner side diameter of the square groove. That is, when the forming block 2 is inserted into the forming blind hole 3, the lower end of the forming block lateral face 7 can be directly inserted into the square groove 5. There is a circle of recess at the lateral lower part of the forming block 2, and this recess is just clamped at the lateral side of the square groove, so that the forming block lateral face 7 and the square groove form a whole. When the forming block 2 vibrates, the vibration amplitude of the forming block is smaller than the depth of the square groove. For example, the height of the square groove is 1 cm, in the vibration process, the forming block 2 falls down after being upwards pulled for 0.7 cm, so that the lower end of the forming block lateral face always does vertical movement in the square groove, which will not affect the formation of the drill shank blank.

The feed port 10 of the present invention is a conical hole with a large upper part and a small lower part. During feeding, a feeding gun opening is also in a conical shape (with the same taper as the feed port 10). The feeding gun opening is inserted into the feed port 10 for feeding. At the moment, an upper plane of the forming block 2 is flushed with an upper plane of the mold 1. After continuously feeding, the upper plane of the forming block 2 is highly jacked. When the upper plane of the forming block is higher than the upper plane of the mold 1, the feeding stops, then, the feeding gun is taken out, and the feed port is plugged with a plug with the same taper. The inside sealing can be ensured, and the subsequent pressing process is not influenced.

In step (3) of the present invention, a particle size of the metal powder is 5-15 μm. The finer particles are, the easier the forming and sintering are.

According to the preparation process of the novel drill shank for the IMPACT gun drill of the present invention, the special mold and forming block are manufactured. The drill shank is obtained by the powder pressing+electric spark forming+sintering method, and has the strength, toughness and wear resistance. At the same time, the non-cylinder cavity for forming is formed in the drill shank, the process is novel, the manufacturing is convenient, the processing cost is low, and the popularization is convenient.

The technical means disclosed in the solutions of the present invention are not limited to the technical means disclosed in the foregoing implementations, and also includes technical solutions including any combination of the foregoing technical features.

What is claimed is:
1. A method of preparing a novel drill shank for an IMPACT gun drill, comprising the following steps:
 (1) manufacturing a mold and a forming block, wherein a forming blind hole is formed in a middle of the mold, an arc-shaped groove is formed at a bottom of the forming blind hole, a square groove is formed at an outer side of a top of the arc-shaped groove, the forming block is of a cylinder structure with a downward opening, a vertical forming post is disposed in the forming block at a middle position, a top of the vertical forming post is connected to the forming block, a lower end of a forming block lateral face is inserted into the square groove, a length of the vertical forming post is smaller than a length of the forming block, a wire pipe is disposed in the mold, a pull ring is disposed on the forming block, a feed port is formed at one side of the pull ring, and a heating cavity is formed in the forming block lateral face and the vertical forming post;
 (2) manufacturing the forming block with a 2Cr25Ni20 material;
 (3) preparing a metal powder, wherein for a material of the metal powder, 40% of iron powder and 0.5-0.6% of an adsorbing agent are added into tin bronze powder according to a weight ratio, and are uniformly stirred;
 (4) injecting the metal powder into the forming blind hole from the feed port, and sealing the feed port;
 (5) connecting the forming block to a vibration machine through the pull ring to start a vibration pressing, inputting a direct current and a pulse current to communicate with the metal powder, setting a heating temperature in the heating cavity to 860-870° C., forming a drill shank blank after 2-3 min, and taking out the drill shank blank;
 (6) removing the adsorbing agent from the drill shank blank by an extraction method;
 (7) performing a surface processing and a deburring; and
 (8) finally performing a sintering densification to obtain a finished product.
2. The method according to claim 1, wherein in step (1), a cross section of the forming blind hole is triangular, square, pentagonal or hexagonal.
3. The method according to claim 1, wherein in step (1), the vertical forming post is substantially a cylinder provided with one plane or a plurality of planes at a lateral face of the cylinder.
4. The method according to claim 1, wherein in step (1), the lower end of the forming block lateral face is in a wedge fit with a lateral face of the square groove, and an inner side diameter of the forming block is identical to an inner side diameter of the square groove.
5. The method according to claim 1, wherein in step (1), the feed port is a conical hole, and an upper part of the feed port is larger than a lower part of the feed port.
6. The method according to claim 1, wherein in step (3), a particle size of the metal powder is 5-15 μm.
7. The method according to claim 1, wherein in step (3), the adsorbing agent is graphene.
8. The method according to claim 1, wherein in step (5), a depth of the square groove is greater than a vibration amplitude.
9. The method according to claim 1, wherein in step (8), a sintering temperature is 1550° C.

* * * * *